United States Patent
Yin et al.

(10) Patent No.: US 8,562,734 B2
(45) Date of Patent: Oct. 22, 2013

(54) LOW CALCIUM CEMENTITIOUS MATERIAL AND METHOD OF MANUFACTURING LOW CALCIUM CEMENT

(75) Inventors: Samuel Yin, Taipei (TW); Ching-Ting Yang, Taipei (TW); Yuan-Kai Li, Taipei (TW)

(73) Assignee: Ruentex Engineering & Construction Co., Ltd., Taipei (TW)

(*) Notice: Subject to any disclaimer, the term of this patent is extended or adjusted under 35 U.S.C. 154(b) by 87 days.

(21) Appl. No.: 13/163,640

(22) Filed: Jun. 17, 2011

(65) Prior Publication Data
US 2012/0152152 A1    Jun. 21, 2012

(30) Foreign Application Priority Data
Dec. 21, 2010 (TW) ................................ 99144990 A

(51) Int. Cl.
*C04B 18/06* (2006.01)
(52) U.S. Cl.
USPC .................... 106/705; 106/600; 106/DIG. 1
(58) Field of Classification Search
USPC ..................... 106/600, 705, DIG. 1
See application file for complete search history.

(56) References Cited

U.S. PATENT DOCUMENTS

| 6,682,595 B1* | 1/2004 | Barbour ................. 106/736 |
| 7,727,330 B2* | 6/2010 | Ordonez et al. ........... 106/707 |
| 2002/0033119 A1* | 3/2002 | Styron .................. 106/705 |
| 2011/0088598 A1* | 4/2011 | Lisowski et al. ........... 106/709 |
| 2011/0259245 A1* | 10/2011 | Sperisen et al. ............ 106/624 |

FOREIGN PATENT DOCUMENTS

WO    2007/096686 A1    8/2007

* cited by examiner

*Primary Examiner* — Paul Marcantoni
(74) *Attorney, Agent, or Firm* — Cheng-Ju Chiang

(57) ABSTRACT

A low-calcium-cementitious material having a calcium oxide content less than or equal to 10 wt % which is processed at room temperature into a low calcium cement mainly composed of mullite and a method manufacturing of the low calcium cement are provided. The low-calcium-cementitious material includes low calcium fly ash, an alkaline agent, and a congealing agent, wherein the calcium oxide content of the low-calcium-cementitious material is less than or equal to 10 wt %. The low calcium fly ash has a calcium oxide content less than or equal to 10 wt %. The low calcium cement manufacturing method includes providing a low calcium fly ash having a calcium oxide content less than or equal to 10 wt %; providing an alkaline agent; providing a congealing agent; and mixing the low-calcium-content fly ash, the alkaline agent, and the congealing agent and standing the mixture at room temperature to form a low calcium cement.

27 Claims, 4 Drawing Sheets

LOW CALCIUM CEMENTITIOUS MATERIAL AND METHOD OF MANUFACTURING LOW CALCIUM CEMENT

BACKGROUND OF THE INVENTION

1. Field of the Invention

This invention generally relates to a low calcium cementitious material mainly composed of low calcium fly ash which can be processed into low calcium cement at room temperature and a method of manufacturing the low calcium cement.

2. Description of the Prior Art

Fly ash is the by-product of a coal-fired boiler in a combined heat and power system. The global annual emission of fly ash is about 500 million tons. The annual emission of fly ash in China is approximately 160 million tons, wherein only 15% of the fly ash is recycled. Because a large surplus of fly ash is piled up on the ground or buried underground, large area of land is occupied and serious environmental pollution is caused.

Fly ash not only has great chemical stability, but also has many superior physical properties. Hence, fly ash is a generally accepted engineering material. However, because the low content of calcium oxide of class F fly ash (calcium oxide content<10%), conventional alkali-activated cement that mixes the class F fly ash with sodium silicate, sodium hydroxide (or potassium hydroxide), and water cannot harden at room temperature. The alkali-activated cement must be activated at high temperature for several hours to harden, wherein its crystalline phase is characterized to be zeolites ($Na_2Al_2Si_3O_{10}$) by the X-ray diffraction (XRD). Otherwise, fly ash, especially class F fly ash, should be mixed with metakaolin or calcium-containing materials such as, slag, gypsum for increasing the content of calcium to harden at room temperature.

On the other hand, ordinary portland cement is generally poor in acid-resistance and fire-resistance due to its high content of calcium. Therefore, such cement cannot be used as construction material in acidic or high temperature environment. For example, an ordinary pre-cast sewer pipe is generally coated with high alumina cement to increase its acid-resistance, thus increasing the material cost. Moreover, a collapse will occur at high temperature of about 400° C. when the cement suffers fire attack, resulting in a sudden strength break down of the cement.

SUMMARY OF THE INVENTION

It is an object of the present invention to provide a low-calcium-cementitious material mainly containing low calcium fly ash (class F fly ash) which can be processed into low calcium cement at room temperature, therefore to increase the economical value of the low calcium fly ash.

It is another object of the present invention to provide a low calcium cement manufacturing method to form low calcium cement at room temperature by using low calcium fly ash.

In a preferred embodiment, low calcium fly ash is but not limited to class F fly ash. The room temperature is preferably lower than 35° C.

The low-calcium-cementitious material of the present invention includes low calcium fly ash, an alkaline agent, and a congealing agent, wherein the calcium oxide content of the low-calcium-cementitious material is less than or equal to 10 wt %. The weight percent of the low calcium fly ash based on the total weight of the low-calcium-cementitious material is larger than 30 wt %. The low calcium fly ash has a calcium oxide content less than or equal to 10 wt %, preferably less than or equal to 5 wt %. The fineness of the low calcium fly ash is between 2000 $cm^2$/gw and 8000 $cm^2$/gw. The alkaline agent is selected from the group consisting of alkaline-earth metal hydroxide, alkali metal hydroxide, sodium metasilicate, sodium silicate, and a combination thereof, and preferably is sodium hydroxide.

The congealing agent is selected from the group consisting of carbonate metal oxide, sulfate metal oxide, nitrate metal oxide, phosphate metal oxide, aluminum hydroxide, and a combination thereof. The carbonate metal oxide is selected from the group consisting of magnesium carbonate, potassium carbonate, ammonium carbonate, sodium carbonate, and a combination thereof. The sulfate metal oxide is selected from the group consisting of manganous sulfate, copper sulfate, cobaltous sulfate, ferrous sulfate, zinc sulfate, and a combination thereof. The nitrate metal oxide is selected from the group consisting of copper nitrate, ferric nitrate, and a combination thereof. The phosphate metal oxide is selected from the group consisting of sodium phosphate, zinc phosphate, and a combination thereof.

The low-calcium-cementitious material further includes silicofluoride, wherein the silicofluoride is preferably sodium fluosilicate ($Na_2SiF_6$).

The low-calcium-cementitious material further includes an accelerator, wherein the accelerator is preferably triethanolamine.

The low-calcium-cementitious material further includes a drainage agent, wherein the dehydrating agent is preferably lignocellulose.

The crystalline phase of the low-calcium-cementitious material harden at room temperature is characterized to be mullite ($Al_6Si_2O_{13}$) by the X-ray diffraction (XRD).

The low calcium cement manufacturing method of the present invention includes providing a low calcium fly ash having a calcium oxide content less than or equal to 10 wt %; providing an alkaline agent; providing a congealing agent; and mixing the low calcium fly ash, the alkaline agent, and the congealing agent and standing the mixture at room temperature to form a low calcium cement. The low calcium fly ash providing step further includes grinding the low calcium fly ash to make the fineness of the low calcium fly ash be between 2000 $cm^2$/gw and 8000 $cm^2$/gw. The method further includes providing silicofluoride, an accelerator, or a drainage agent before the mixing step.

DETAILED DESCRIPTION OF THE PREFERRED EMBODIMENT

Figure 1:
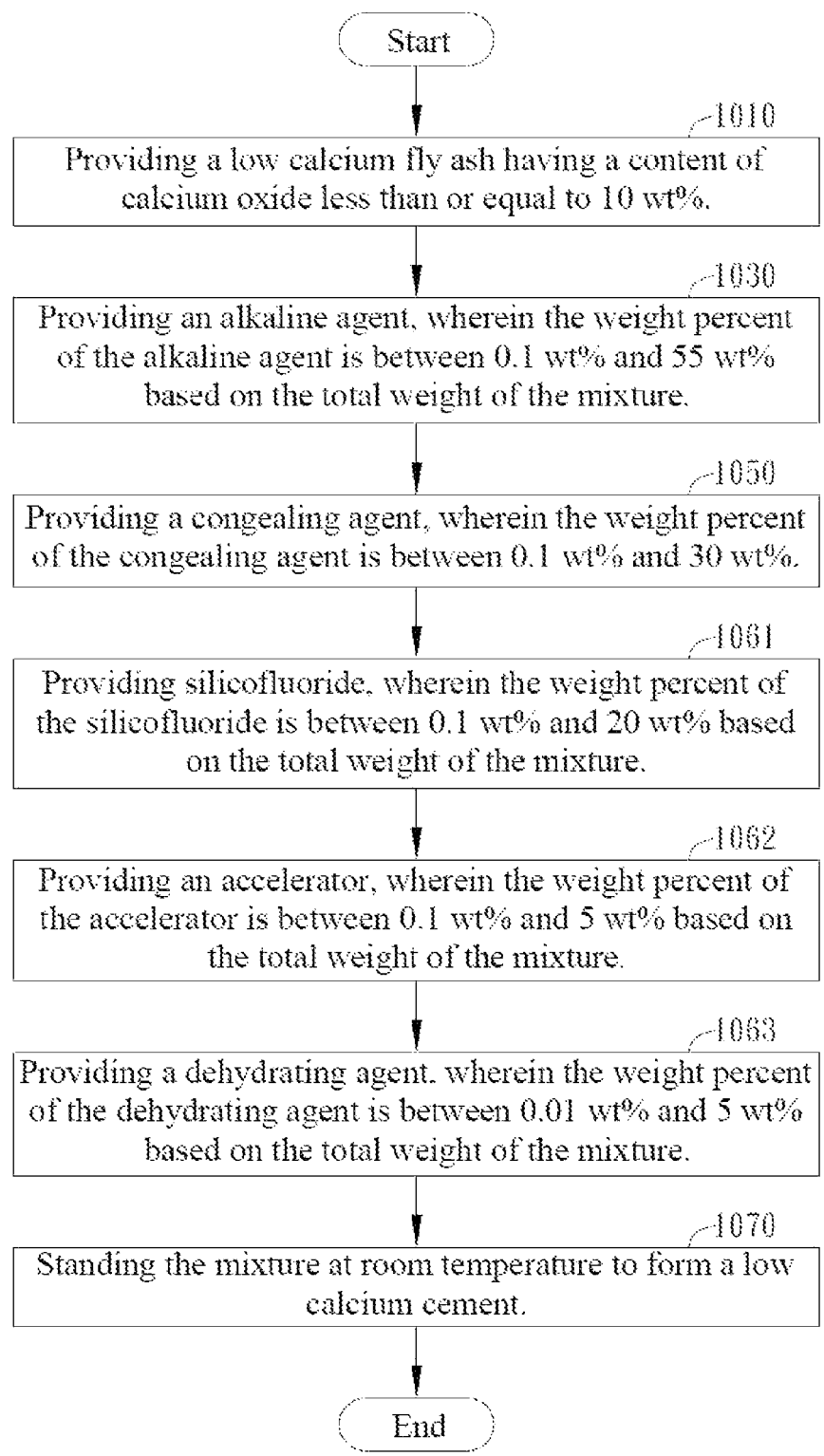
FIG. 1 is a flowchart of the low calcium cement manufacturing method of the present invention.

A low-calcium-cementitious material having a calcium oxide content less than or equal to 10 wt % is disclosed. The low-calcium-cementitious material can be processed at room temperature into a low calcium cement that mainly contains mullite ($Al_6Si_2O_{13}$). The room temperature is preferably lower than 35° C. However, the room temperature can refer to the ambient temperature without heating. The low-calcium-cementitious material includes a low calcium fly ash, an alkaline agent, and a congealing agent. The weight percent of the low calcium fly ash based on the total weight of the low-calcium-cementitious material is between 30 wt % and 95 wt %. The low calcium fly ash has a calcium oxide content less than or equal to 10 wt %. More particularly, fly ash refers to fine particles carried out of the combustion chamber by the exhaust gas and caught by a dust-collecting equipment when a power plant burns coal. In a preferred embodiment, the low calcium fly ash is class F fly ash, i.e. the calcium oxide content is less than or equal to 10%. In a more preferred embodiment, the calcium oxide content is less than or equal to 5%. The fineness of the low calcium fly ash is preferably between 2000 $cm^2/gw$ and 8000 $cm^2/gw$. More particularly, the fineness of the low calcium fly ash can be increased to between 2000 $cm^2/gw$ and 8000 $cm^2/gw$ by grinding. Hence, the low calcium fly ash is more uniform to contribute to the hardening reaction of the cement.

The weight percent of the alkaline agent based on the total weight of the low-calcium-cementitious material is between 0.1 wt % and 55 wt %. The alkaline agent is selected from the group consisting of alkaline-earth metal hydroxide, alkali metal hydroxide, sodium metasilicate, sodium silicate, and a combination thereof, and preferably is sodium hydroxide. The alkaline agent can be powder or liquid. The alkaline agent is taken as an activator. More particularly, the particles contact water and form gel on the surface when the low-calcium-cementitious material carries out a hydration reaction. The gel is water-insoluble, which leads to a standstill of the reaction. The alkaline agent can corrode the gel on the surface to expose the particles to continue the hydration reaction. Moreover, the metal ion in the alkaline agent can balance the charge and contribute to the combination of the particles into 3D gel.

The weight percent of the congealing agent based on the total weight of the low-calcium-cementitious material is between 0.1 wt % and 30 wt %. The congealing agent is selected from the group consisting of carbonate metal oxide, sulfate metal oxide, nitrate metal oxide, phosphate metal oxide, aluminum hydroxide, and a combination thereof. The congealing agent can be powder or liquid. More particularly, the congealing agent is to promote and accelerate the cement forming reaction. The carbonate metal oxide is selected from the group consisting of magnesium carbonate, potassium carbonate, ammonium carbonate, sodium carbonate, and a combination thereof. The sulfate metal oxide is selected from the group consisting of manganous sulfate, copper sulfate, cobaltous sulfate, ferrous sulfate, zinc sulfate, and a combination thereof. The nitrate metal oxide is selected from the group consisting of copper nitrate, ferric nitrate, and a combination thereof. The phosphate metal oxide is selected from the group consisting of sodium phosphate, zinc phosphate, and a combination thereof.

In a preferred embodiment, the low-calcium-cementitious material further includes silicofluoride, wherein the weight percent of the silicofluoride based on the total weight of the low-calcium-cementitious material is between 0.1 wt % and 20 wt %. The silicofluoride is preferably sodium fluosilicate. The silicofluoride is for supplying silicon dioxide. The low-calcium-cementitious material further includes an accelerator, wherein the weight percent of the accelerator based on the total weight of the low-calcium-cementitious material is between 0.1 wt % and 5 wt %. The accelerator is preferably triethanolamine. The accelerator is for accelerating the cement forming reaction. The low-calcium-cementitious material further includes a drainage agent, wherein the weight percent of the dehydrating agent based on the total weight of the low-calcium-cementitious material is between 0.1 wt % and 5 wt %. The dehydrating agent is preferably lignocellulose.

Compared with the prior arts, the low-calcium-cementitious material of the present invention mainly contains low calcium fly ash and can be processed to form a low calcium cement at room temperature without adding other calcium-containing materials or highly active materials having better activity such as metakaolin, ground granulated blast-furnace slag (GGBFS), niter powder (calcium hydroxide), or gypsum. Therefore, the economical value of the low calcium fly ash can be increased. Moreover, the low calcium cement made from the low-calcium-cementitious material of the present invention is good in acid-resistance and fire-resistance due to its low calcium content. Therefore, it can be used as construction material in acidic or high temperature environment. For example, a pre-cast sewer pipe made of the low calcium cement is innately good in acid-resistance, wherein an additional high alumina cement coating is not necessary and the material cost can be reduced.

As shown in FIG. 1, the low calcium cement manufacturing method in a preferred embodiment of the present invention includes providing a mixture which includes the following steps.

Step 1010, the step of providing a low calcium fly ash having a content of calcium oxide less than or equal to 10 wt % is performed, wherein the weight percent of the low calcium fly ash is between 30 wt % and 95 wt % based on the total weight of the mixture. In a preferred embodiment, grinded low calcium fly ash having the fineness between 2000 $cm^2/gw$ and 8000 $cm^2/gw$ and a calcium oxide content less than or equal to 5 wt % is provided.

Step 1030, the step of providing an alkaline agent is performed, wherein the weight percent of the alkaline agent is between 0.1 wt % and 55 wt % based on the total weight of the mixture. The alkaline agent is preferably selected from the group consisting of alkaline-earth metal hydroxide, alkali metal hydroxide, sodium silicate, sodium metasilicate, and a combination thereof. In a preferred embodiment, the alkali agent is sodium hydroxide.

Step 1050, the step of providing a congealing agent is performed, wherein the weight percent of the congealing agent is between 0.1 wt % and 30 wt %. The congealing agent is selected from the group consisting of carbonate metal oxide, sulfate metal oxide, nitrate metal oxide, phosphate metal oxide, aluminum hydroxide, and a combination thereof. In a preferred embodiment, the congealing agent is carbonate metal oxide and sulfate metal oxide.

Figure 2A:
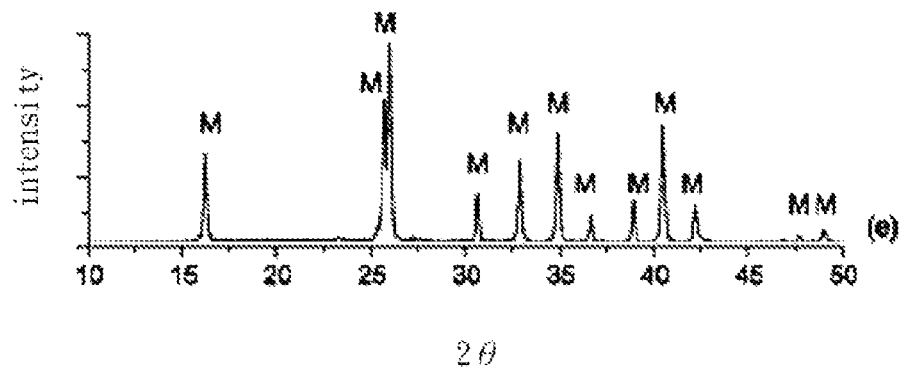
FIG. 2A is the X-ray diffraction diagram of mullite.
Figure 2B:
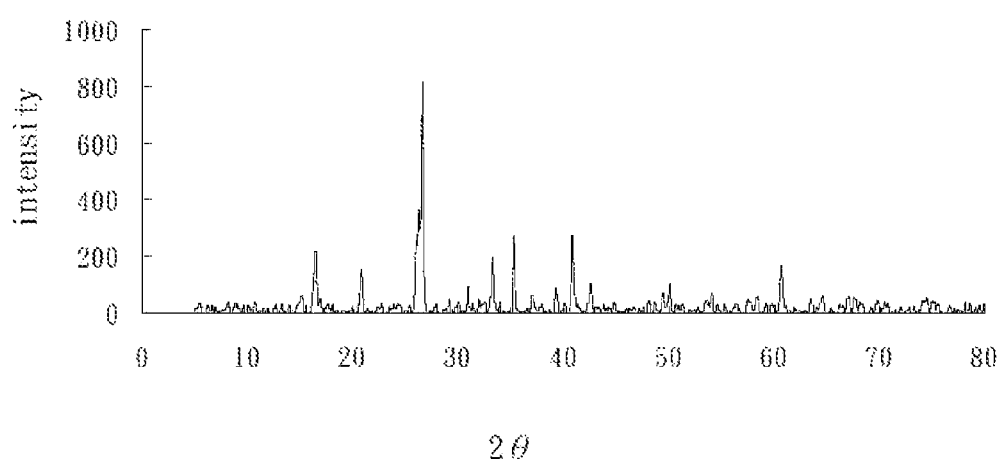
FIG. 2B is the X-ray diffraction diagram of a low calcium cement harden from the low-calcium-cementitious material of the present invention at room temperature.

After the providing of the low calcium fly ash, the alkaline agent, and the congealing agent, the step of mixing the low calcium fly ash, the alkaline agent, and the congealing agent is performed to form the mixture. The method further includes Step 1070 of standing the mixture at room temperature to form a low calcium cement. The crystalline phase of the low-calcium-cementitious material harden at room temperature is characterized to be mullite ($Al_6Si_2O_{13}$) by the X-ray diffraction (XRD). More particularly, FIG. 2A is the X-ray diffraction diagram of mullite, wherein M is an abbreviation of mullite. FIG. 2B is the X-ray diffraction diagram of a low calcium cement harden from the low-calcium-cementitious material of the present invention at room temperature. It is confirmed by analyzing the crystalline phase, i.e. by comparing FIG. 2A with FIG. 2B, the crystalline phase of the low calcium cement harden from the low-calcium-cementitious material of the present invention at room temperature is identical to the crystalline phase of mullite. Therefore, it is confirmed the low calcium cement harden from the low-calcium-cementitious material of the present invention at room temperature is mainly composed of mullite.

Figure 2C:
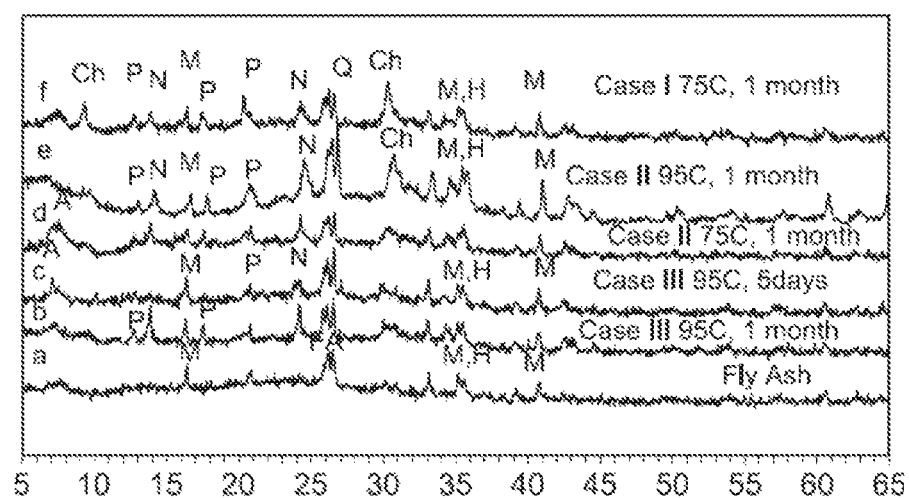
FIG. 2C is the X-ray diffraction diagram of a conventional alkali-activated cement harden by being activated at high temperature for several hours.

On the other hand, FIG. 2C is the X-ray diffraction diagram of a conventional alkali-activated cement harden by being activated at high temperature for several hours, wherein Ch represents chabazite (a kind of zeolite), P represents Na—P1 (gismondine, a kind of zeolite), N represents hydroxysodalite (a kind of zeolite), A represents Linde Type A (a kind of zeolite), Q represents quartz, M represents mullite, H represents hematite. It is known from FIG. 2C, a conventional alkali-activated cement harden by being activated at high temperature for several hours is mainly composed of zeolite.

As shown in FIG. 1, in a preferred embodiment, the low-calcium-content cement manufacturing method further includes the following steps.

Step 1061, the step of providing silicofluoride is performed, wherein the weight percent of the silicofluoride is between 0.1 wt % and 20 wt % based on the total weight of the mixture. The silicofluoride is preferably sodium fluosilicate.

Step 1062, the step of providing an accelerator is performed, wherein the weight percent of the accelerator is between 0.1 wt % and 5 wt % based on the total weight of the mixture. The accelerator is preferably triethanolamine.

Step 1063, the step of providing a dehydrating agent is performed, wherein the weight percent of the dehydrating agent is between 0.01 wt % and 5 wt % based on the total weight of the mixture. The order of steps of providing the components of the mixture can be changed as required. In other words, it is merely required to provide the materials before mixing and standing the mixture.

Figure 3:
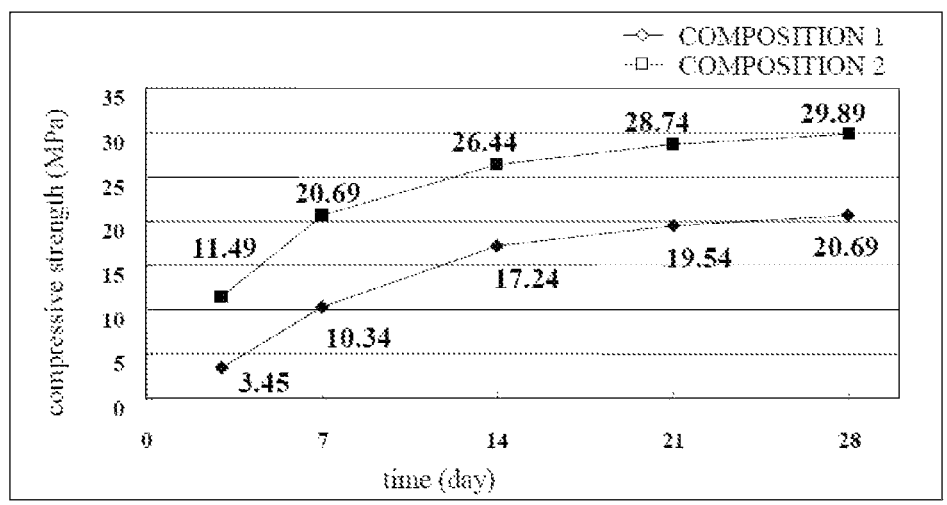
FIG. 3 is a diagram showing the result of compressive strength test of a low calcium cement hardening from the low-calcium-cementitious material of the present invention at room temperature.

The results of compressive strength test of low-calcium cements harden from the low-calcium-cementitious material of the present invention at room temperature are illustrated below. TABLE 1 and TABLE 2 respectively represent low-calcium-cementitious materials having COMPOSITION 1 and COMPOSITION 2, wherein FIG. 3 is a diagram showing the result of compressive strength test of low calcium cements hardening from the low-calcium-cementitious materials of the present invention at room temperature.

TABLE 1

(COMPOSITION 1)

| components in the mixture | Content (based on the total weight of the mixture) |
| --- | --- |
| low calcium fly ash | 57.4 wt % |
| sodium hydroxide | 2.1 wt % |
| sodium silicate | 31.9 wt % |
| magnesium carbonate | 5.7 wt % |
| sodium fluosilicate | 2.9 wt % |
| total | 100 wt % |

TABLE 2

(COMPOSITION 2)

| components in the mixture | Content (based on the total weight of the mixture) |
| --- | --- |
| low calcium fly ash | 58.2 wt % |
| sodium hydroxide | 2.1 wt % |
| sodium silicate | 32.4 wt % |
| ferrous sulfate | 4.1 wt % |

TABLE 2-continued (COMPOSITION 2)

| components in the mixture | Content (based on the total weight of the mixture) |
| --- | --- |
| sodium fluosilicate | 2.9 wt % |
| triethanolamine | 0.3 wt % |
| total | 100 wt % |

It is known from FIG. 3, the compressive strength of low-calcium-cementitious materials having COMPOSITION 1 and COMPOSITION 2 after 28 days are both higher than 20 MPa, which means both the materials have good compressive strength.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A low-calcium-cementitious material having a calcium oxide content less than or equal to 10 wt %, wherein the low-calcium-cementitious material is capable of being processed at room temperature to form a low calcium cement, wherein the crystalline phase of the low-calcium-cementitious material harden at room temperature is characterized to be mullite, the low-calcium-cementitious material comprising:
    a low calcium fly ash having a calcium oxide less than or equal to 10 wt %, wherein the weight percent of the low-calcium-content fly ash based on the total weight of the low-calcium-cementitious material is between 30 wt % and 95 wt %;
    a sodium hydroxide, wherein the weight percent of the sodium hydroxide based on the total weight of the low-calcium-cementitious material is between 0.1 wt % and 55 wt %; and
    a magnesium carbonate, wherein the weight percent of the magnesium carbonate based on the total weight of the low-calcium-cementitious material is between 0.1 wt % and 30 wt %.

2. The low-calcium-cementitious material of claim 1, wherein the room temperature is lower than 35° C.

3. The low-calcium-cementitious material of claim 1, wherein the calcium oxide content is less than or equal to 5 wt %.

4. The low-calcium-cementitious material of claim 1, wherein the fineness of the low calcium fly ash is between 2000 cm$^2$/g and 8000 cm$^2$/g.

5. The low-calcium-cementitious material of claim 1, further comprising silicofluoride, wherein the weight percent of the silicofluoride based on the total weight of the low-calcium-cementitious material is between 0.1 wt % and 20 wt %.

6. The low-calcium-cementitious material of claim 5, wherein the silicofluoride is sodium fluosilicate.

7. The low-calcium-cementitious material of claim 1, further comprising an accelerator, wherein the weight percent of the accelerator based on the total weight of the low-calcium-cementitious material is between 0.1 wt % and 5 wt %.

8. The low-calcium-cementitious material of claim 7, wherein the accelerator is triethanolamine.

9. The low-calcium-cementitious material of claim 1, further comprising a dehydrating agent, wherein the weight percent of the dehydrating agent based on the total weight of the low-calcium-cementitious material is between 0.01 wt % and 5 wt %.

10. The low-calcium-cementitious material of claim 9, wherein the dehydrating agent is lignocellulose.

11. A low-calcium-content cement manufacturing method, comprising:
   providing a mixture, comprising:
      providing 30 wt % to 95 wt % of low calcium fly ash based on the total weight of the mixture, wherein the low calcium fly ash has a calcium oxide content less than or equal to 10 wt %;
      providing 0.1 wt % to 55 wt % of an alkaline agent based on the total weight of the mixture;
      providing 0.1 wt % to 30 wt % of a congealing agent based on the total weight of the mixture; and
      mixing the low calcium fly ash, the alkaline agent, and the alkaline agent; and
   standing the mixture at room temperature to form a low calcium cement.

12. The method of claim 11, wherein the room temperature is lower than 35° C.

13. The method of claim 11, wherein the formed low calcium cement at room temperature contains mullite.

14. The method of claim 11, wherein the step of providing the low calcium fly ash includes grinding the low calcium fly ash to make the fineness of the low calcium fly ash be between 2000 cm$^2$/g and 8000 cm$^2$/g.

15. The method of claim 11, wherein the calcium oxide content is less than or equal to 5 wt %.

16. The method of claim 11, wherein the alkaline agent is selected from the group consisting of alkaline-earth metal hydroxide, alkali metal hydroxide, sodium silicate, sodium metasilicate, and a combination thereof.

17. The method of claim 11, wherein the congealing agent is selected from the group consisting of carbonate metal oxide, sulfate metal oxide, nitrate metal oxide, phosphate metal oxide, aluminum hydroxide, and a combination thereof.

18. The method of claim 17, wherein the carbonate metal oxide is selected from the group consisting of magnesium carbonate, potassium carbonate, ammonium carbonate, sodium carbonate, and a combination thereof.

19. The method of claim 17, wherein the sulfate metal oxide is selected from the group consisting of manganous sulfate, copper sulfate, cobaltous sulfate, ferrous sulfate, zinc sulfate, and a combination thereof.

20. The method of claim 17, wherein the nitrate metal oxide is selected from the group consisting of copper nitrate, ferric nitrate, and a combination thereof.

21. The method of claim 17, wherein the phosphate metal oxide is selected from the group consisting of sodium phosphate, zinc phosphate, and a combination thereof.

22. The method of claim 11, wherein the step of providing the mixture further comprises providing 0.1 wt % to 20 wt % of silicofluoride based on the total weight of the mixture before the mixing step.

23. The method of claim 22, wherein the silicofluoride is sodium fluosilicate.

24. The method of claim 11, wherein the step of providing the mixture further comprises providing 0.1 wt % to 5 wt % of an accelerator based on the total weight of the mixture before the mixing step.

25. The method of claim 24, wherein the accelerator is triethanolamine.

26. The method of claim 11, wherein the step of providing the mixture further comprises providing 0.01 wt % and 5 wt % of a dehydrating agent based on the total weight of the mixture before the mixing step.

27. The method of claim 26, wherein the dehydrating agent is lignocellulose.

* * * * *